(12) United States Patent
Garcia et al.

(10) Patent No.: US 10,445,241 B2
(45) Date of Patent: Oct. 15, 2019

(54) PREFETCHING USING OFFSET DATA TO ACCESS A POINTER WITHIN A CURRENT DATA ELEMENT FOR USE IN PREFETCHING A SUBSEQUENT DATA ELEMENT

(71) Applicant: Arm Limited, Cambridge (GB)

(72) Inventors: Lucas Garcia, Antibes (FR); Laurent Claude Desnogues, Vence (FR); Adrien Pesle, Roquefort les Pins (FR); Vincenzo Consales, Paca (FR)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/912,659

(22) Filed: Mar. 6, 2018

(65) Prior Publication Data

US 2019/0278709 A1    Sep. 12, 2019

(51) Int. Cl.
*G06F 12/08* (2016.01)
*G06F 12/0862* (2016.01)

(52) U.S. Cl.
CPC .... *G06F 12/0862* (2013.01); *G06F 2212/602* (2013.01); *G06F 2212/6022* (2013.01); *G06F 2212/6024* (2013.01)

(58) Field of Classification Search
None
See application file for complete search history.

(56) References Cited

U.S. PATENT DOCUMENTS 5,537,573 A * 7/1996 Ware ................... G06F 12/0862
                                                711/137
5,822,788 A * 10/1998 Kahn ..................... G06F 9/355
                                                711/213
6,055,622 A * 4/2000 Spillinger ............... G06F 9/383
                                                711/169
7,225,297 B2 * 5/2007 Heil .................... G06F 12/0862
                                                711/137
7,480,739 B1 * 1/2009 Berendsen ............ G06F 13/385
                                                710/313
7,996,203 B2 * 8/2011 Xiao ..................... G06F 9/3851
                                                703/21
8,161,264 B2 * 4/2012 Arimilli .............. G06F 12/0862
                                                711/204
8,166,277 B2 * 4/2012 Arimilli .............. G06F 12/0862
                                                711/204

(Continued)

OTHER PUBLICATIONS

Nesbit et al., "Data Cache Prefetching Using a Global History Buffer", IEEE Micro, Jan.-Feb. 2005, pp. 90-97.

(Continued)

*Primary Examiner* — Kevin Verbrugge
(74) *Attorney, Agent, or Firm* — Nixon & Vanderhye P.C.

(57) ABSTRACT

Data processing circuitry comprises a processing element to execute successive iterations of program code to access a set of data elements in memory, each iteration accessing one or more respective data elements of the set; a data element structure memory to store a memory address relationship between the data elements of the set; and prefetch circuitry, responsive to an access by a current program code iteration to a current data element of the set, to detect, using the memory address relationship stored in the data element structure memory a memory address defining a subsequent data element to be accessed by a next program iteration and to initiate prefetching of at least a portion of the subsequent data element from memory.

18 Claims, 6 Drawing Sheets

(56) References Cited

U.S. PATENT DOCUMENTS

| | | | | |
|---|---|---|---|---|
| 9,652,240 B2* | 5/2017 | Jackson | G06F 12/0875 | |
| 2003/0217231 A1* | 11/2003 | Seidl | G06F 12/0862 | 711/137 |
| 2005/0210198 A1* | 9/2005 | Dimpsey | G06F 9/30181 | 711/137 |
| 2005/0268046 A1* | 12/2005 | Heil | G06F 12/0862 | 711/137 |
| 2008/0155196 A1* | 6/2008 | Black | G06F 9/30043 | 711/119 |
| 2008/0244232 A1* | 10/2008 | Sherman | G06F 9/383 | 712/207 |
| 2009/0198904 A1* | 8/2009 | Arimilli | G06F 12/0862 | 711/137 |
| 2009/0198906 A1* | 8/2009 | Armilli | G06F 12/0862 | 711/137 |
| 2009/0198950 A1* | 8/2009 | Arimilli | G06F 12/0862 | 711/205 |
| 2010/0146248 A1* | 6/2010 | Mayer | G06F 9/3806 | 712/237 |
| 2011/0264860 A1* | 10/2011 | Hooker | G06F 12/0862 | 711/122 |
| 2018/0052779 A1* | 2/2018 | McCauley | G06F 12/0862 | |
| 2018/0181402 A1* | 6/2018 | Zhang | G06F 9/3455 | |

OTHER PUBLICATIONS

Collins et al., "Pointer Cache Assisted Prefetching", 35<sup>th</sup> Annual International Symposium on Microarchitecture (MICRO-35), Nov. 2002, 12 pages.

Somogyi et al., "Spatial Memory Streaming", Journal of Instruction-Level Parallelism 13, Jan. 2011, pp. 1-26.

* cited by examiner

PREFETCHING USING OFFSET DATA TO ACCESS A POINTER WITHIN A CURRENT DATA ELEMENT FOR USE IN PREFETCHING A SUBSEQUENT DATA ELEMENT

BACKGROUND

This disclosure relates to data processing.

Some examples of data processing involve a processing element executing successive iterations of program code to access a set of data elements in memory, each iteration accessing one or more respective data elements of the set.

There is a constant aim to improve the throughput of data processing operations.

SUMMARY

In an example arrangement there is provided data processing circuitry comprising:

a processing element to execute successive iterations of program code to access a set of data elements in memory, each iteration accessing one or more respective data elements of the set;

a data element structure memory to store a memory address relationship between the data elements of the set; and prefetch circuitry, responsive to an access by a current program code iteration to a current data element of the set, to detect, using the memory address relationship stored in the data element structure memory a memory address defining a subsequent data element to be accessed by a next program iteration and to initiate prefetching of at least a portion of the subsequent data element from memory.

In another example arrangement there is provided data processing circuitry comprising:

processing means for executing successive iterations of program code to access a set of data elements in memory, each iteration accessing one or more respective data elements of the set;

data element structure storing means for storing a memory address relationship between the data elements of the set; and prefetch means, responsive to an access by a current program code iteration to a current data element of the set, for detecting, using the memory address relationship stored in the data element structure storing means, a memory address defining a subsequent data element to be accessed by a next program iteration and for initiating prefetching of at least a portion of the subsequent data element from memory.

In another example arrangement there is provided a data processing method comprising:

executing successive iterations of program code to access a set of data elements in memory, each iteration accessing one or more respective data elements of the set;

storing a memory address relationship between the data elements of the set; and in response to an access by a current program code iteration to a current data element of the set, detecting, using the stored memory address relationship, a memory address defining a subsequent data element to be accessed by a next program iteration and initiating prefetching of at least a portion of the subsequent data element from memory.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
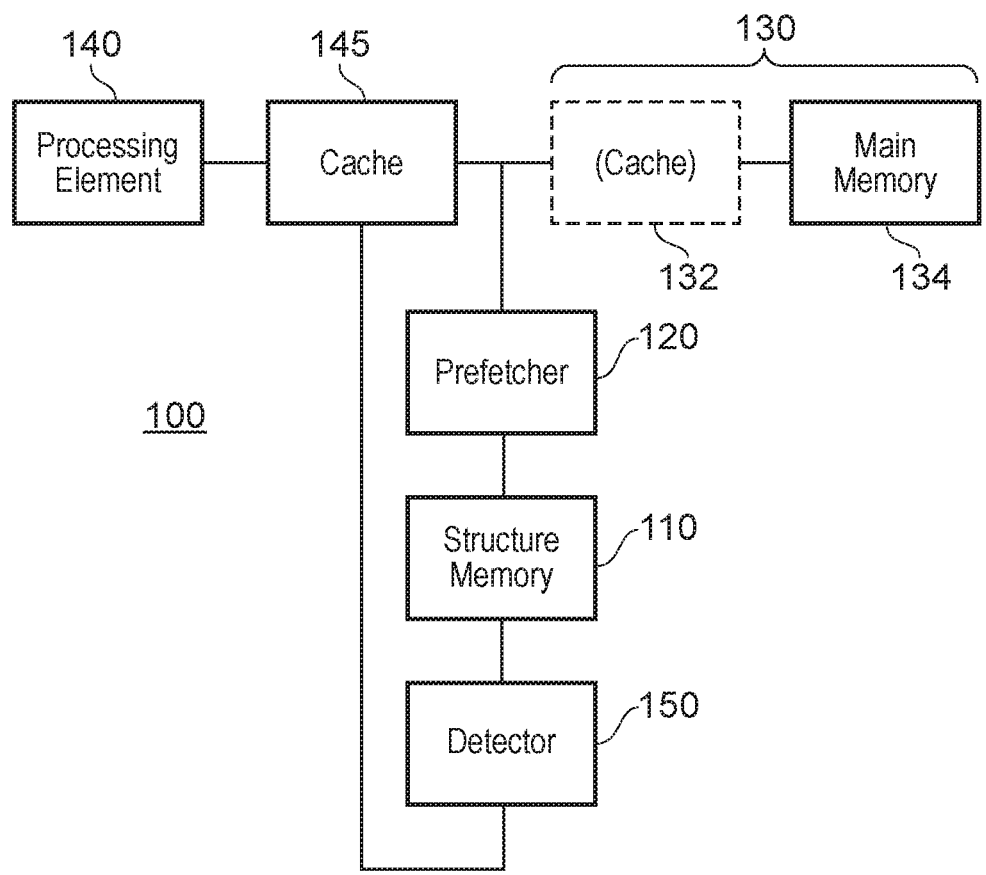
FIG. 1 schematically illustrates an example of data processing circuitry.

Before discussing the embodiments with reference to the accompanying figures, the following description of embodiments is provided.

An example embodiment provides data processing circuitry comprising:

a processing element to execute successive iterations of program code to access a set of data elements in memory, each iteration accessing one or more respective data elements of the set;

a data element structure memory to store a memory address relationship between the data elements of the set; and prefetch circuitry, responsive to an access by a current program code iteration to a current data element of the set, to detect, using the memory address relationship stored in the data element structure memory, a memory address defining a subsequent data element to be accessed by a next program iteration and to initiate prefetching of at least a portion of the subsequent data element from memory.

According to the example embodiments, in an arrangement in which successive data elements or data structures are accessed by respective iterations of program code, a detection of a memory address relationship between successive ones of the data elements allows the prefetching of a subsequent data element to be initiated in response to a current data element being accessed. By initiating the prefetching of such data elements, processing throughput can be potentially improved.

Note that this technique can be complementary, or in other words work alongside or instead of, techniques such as so-called Spatial Memory Streaming, in which multiple locations within a single data element are predicted (and which multiple locations are all accessed by an iteration of the program code before the program code moves onto the subsequent data element in a next iteration).

In some examples, each data element has a memory location pointed to by a pointer stored at a respective pointer location; the memory address relationship comprises offset data indicating an address separation between pointer locations for successive data elements; and the prefetch circuitry is configured to apply the offset data to the pointer location of the current data element in order to access a pointer defining a memory location for use in prefetching at least a portion of the subsequent data element.

In this example, using for example an array of pointers, the memory address relationship can be used to locate a next pointer from the location of a currently accessed pointer. To achieve this, the circuitry may comprise a detector to detect the memory address relationship, for storage in the data element structure memory, from the pointer locations of pointers accessed by the program code iterations and to identify the offset data from an address separation between pointer locations.

Conveniently the detector may be configured to store, in a pointer cache, data defining the location of a detected pointer. The detector can achieve the detection function by being configured to generate the offset data as the address difference between a current pointer location and a previously accessed pointer location, where that difference is less than a threshold difference.

In other examples, in a so-called table structure arrangement, the data elements have memory locations separated by an element displacement; the memory address relationship comprises offset data indicating the element displacement; and the prefetch circuitry is configured to apply the offset data to the memory location of the current data element in order to derive a memory location for use in prefetching at least a portion of the subsequent data element.

Here, a detector can detect the memory address relationship, for storage in the data element structure memory, from the memory locations of data elements accessed by the program code iterations and to identify the offset data from an address separation between memory locations. Conveniently the detector can be configured to generate the offset data as the address difference between a current data element location and a previously accessed data element location, where that difference is less than a threshold difference.

In another example of a so-called linked list arrangement, the subsequent data element has a memory location pointed to by a pointer at a respective pointer location within the current data element; the memory address relationship comprises offset data indicating the pointer location relative to a data element; and the prefetch circuitry is configured to apply the offset data to the current data element in order to access the pointer within the current data element defining a memory location for use in prefetching at least a portion of the subsequent data element.

This arrangement can be conveniently implemented by using a pointer detector to detect, for each portion of a data element accessed by a program code iteration, whether that portion contains a pointer and to store, in a pointer cache, data defining the location within the data element and the target of a detected pointer.

An example technique for using the data stored in the pointer cache is one in which a detector is used to detect the memory address relationship, for storage in the data element structure memory, by a comparison of target locations within the pointer cache; and the detector is configured to generate the offset data in dependence upon the location of a given pointer in the pointer cache when the address difference between the current data element location and the target location for the given pointer is less than a threshold difference.

In examples of a linked list arrangement, the prefetch circuitry may be configured to retrieve at least a portion of the subsequent data element and to detect using the memory address relationship stored in the data element structure memory a pointer to a further data element to be accessed by a further program iteration and to initiate prefetching of at least a portion of the further data element from memory.

In example arrangements, access to a data element may proceed by a program code iteration being configured to first access a data element at a first access address within the data element; the memory address relationship comprising second offset data representing the location of the first access address within each data element; and the prefetch circuitry being configured to prefetch at least a portion of the subsequent data element at the first access address within the subsequent data element defined by the second offset data.

As mentioned above, other techniques such as Spatial Memory Streaming can be used in conjunction with the present techniques, for example in which the prefetch circuitry is responsive to data defining one or more other access addresses, relative to the first access address, to prefetch respective portions of the data element at the one or more other access addresses.

In general, the technique can be conveniently implemented by a detector to detect the memory address relationship, for storage in the data element structure memory, from data defining data elements accessed by the program code iterations. For example the detector can be configured to maintain a history buffer storing data defining data elements accessed by one or more previous program code iterations.

Another example embodiment provides data processing circuitry comprising:

processing means for executing successive iterations of program code to access a set of data elements in memory, each iteration accessing one or more respective data elements of the set;

data element structure storing means for storing a memory address relationship between the data elements of the set; and prefetch means, responsive to an access by a current program code iteration to a current data element of the set, for detecting, using the memory address relationship stored in the data element structure storing means, a memory address defining a subsequent data element to be accessed by a next program iteration and for initiating prefetching of at least a portion of the subsequent data element from memory.

Another example embodiment provides a data processing method comprising:

executing successive iterations of program code to access a set of data elements in memory, each iteration accessing one or more respective data elements of the set;

storing a memory address relationship between the data elements of the set; and in response to an access by a current program code iteration to a current data element of the set, detecting, using the stored memory address relationship, a memory address defining a subsequent data element to be accessed by a next program iteration and initiating prefetching of at least a portion of the subsequent data element from memory.

Referring now to the drawings, FIG. 1 schematically illustrates data processing circuitry 100 comprising: a prefetcher 120 to initiate a cache memory 145 to fetch into the cache memory 145 one or more next data items (instructions and/or data items on which the instructions operate) from a memory system 130 including, for example, a main memory 134 and/or optionally one or more higher levels of cache memory 132, and a processing element 140 to execute instructions fetched to the cache memory 145. The prefetcher 120 provides information to the cache memory 145 indicating a prediction of a next-required (or a laterrequired) cache line. If that cache line is already in the cache memory 145 then no action is needed by the cache memory 145. Otherwise, the cache memory 145 can fetch the predicted line(s) from the memory system 130.

The apparatus also comprises a structure memory 110 and a data structure detector 150.

In operation, in situations in which the processing element 140 is executing program instructions which successively and iteratively access data elements (or a set of data elements) in memory, the detector 150 is arranged to detect, from properties and aspects of the successively accessed data elements, a memory address relationship between the data elements of the set and to store an indication of that memory address relationship in the structure memory 110. The prefetcher 120 detects, using the memory address relationship stored in the structure memory 110, a memory address defining a next or subsequent data element to be accessed by a next program iteration (which could be an iteration that accesses multiple data elements, for example as shown below in FIGS. 6 and 7) and initiates prefetching of at least a portion of the subsequent data element from memory.

Figure 2:
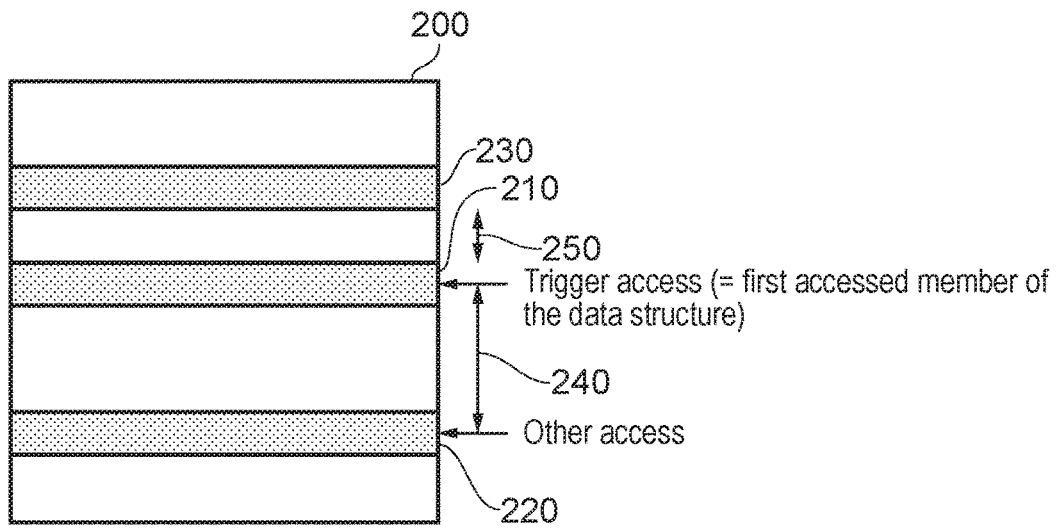
FIG. 2 schematically illustrates a data element.

FIG. 2 schematically illustrates an example of a basic data element 200 of the type under discussion. The data element comprises multiple cache lines, which are schematically represented as horizontal slices of FIG. 2 such that an access address within the data element is represented on a vertical axis. When the data element 200 is first accessed, a particular address or location 210 within the data element, referred to as a trigger access, is obtained first by the processing element 140. However, after that, other accesses to other portions of the data element 200 are made, relative to the trigger access location, such as to portions 220, 230. Often these may be at a constant address displacement 240, 250 relative to the trigger access, and a technique known as spatial memory streaming, defined in the paper "Spatial Memory Streaming", Somogyi et al, Journal of Instruction-Level Parallelism 13 (2011) 1-27, the contents of which are hereby incorporated into this description by reference. Spatial memory streaming deals with noting similarities between subsequent accesses 220, 230 and the trigger access in successively accessed data elements so as to predict the subsequent accesses for later data elements.

The present techniques, however, deal with predicting the location in memory of the subsequent data elements themselves.

Figure 3:
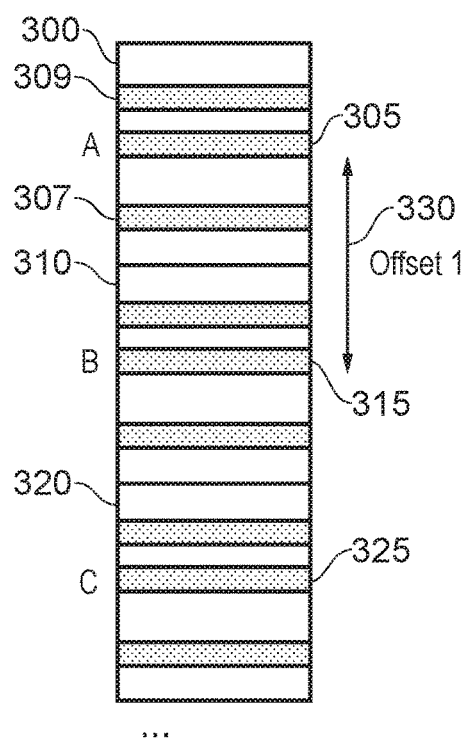
FIG. 3 schematically illustrates a table structure of data elements.

FIG. 3 schematically illustrates a table structure comprising multiple data elements 300, 310, 320 which are adjacent in memory. The trigger accesses 305, 315, 325 are at the same position within the respective data elements 300, 310, 320. In the table structure, they are separated in memory by an offset referred to as Offset 1 330. It can be seen that the Offset 1 may well be equal to the length of a single data element, but it is noted that the data element length may not necessarily be known by the prefetcher 120.

Accesses to data elements of this type may be carried out by, for example, a loop operation in program code, such as code which is compiled from a loop of the following example pseudocode form:

While [a condition applies implying there are more elements to be processed]
{access element and perform processing;
select next element}

In terms of machine instructions, the portion within the brackets { . . . } may include a series of instructions along the lines of:

PCn LDR @ TA (where PCn=arbitrary program counter position in the code and TA=trigger access address)
PCn+4 LDR @ TA+4
PCn+8 LDR @ TA−2

So, considering a first example data element 300:
assume the trigger access is at a memory address A
then two example subsequent accesses are made at A+4 (an access 307) and A−2 (an access 309)
The trigger access for the next memory element is at B
then two example subsequent accesses are made at B+4 and B−2
and so on By comparing successive addresses accessed at the program counter value PCn, the value of Offset 1 can be established as, for example, B−A.

Based on the derived Offset 1 in this situation, in response to a trigger access to a data element at A, the prefetcher 120 is able to initiate prefetching of the data element at a trigger address of B (which equals A+Offset 1, and, in due course, the subsequent data element at a trigger address of C (which equals B+Offset 1) and so on.

Therefore, in the example of FIG. 3, the data elements have memory locations separated by an element displacement (Offset 1); the memory address relationship comprises offset data indicating the element displacement; and the prefetch circuitry is configured to apply the offset data to the memory location of the current data element in order to derive a memory location for use in prefetching at least a portion of the subsequent data element.

The arrangement of FIG. 3 can be handled by a detector 150 to detect the memory address relationship, for storage in the data element structure memory, from the memory locations of data elements accessed by the program code iterations and to identify the offset data from an address separation between memory locations. The detector may be configured to generate the offset value Offset 1 as the address difference between successive trigger accesses (for example, A and B), for example where that difference is less than a threshold difference.

Figure 4:
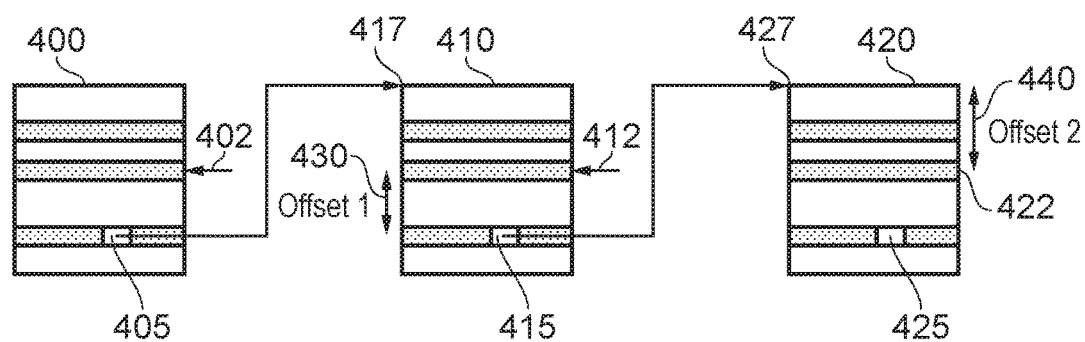
FIG. 4 schematically illustrates a linked list structure of data elements.

FIG. 4 schematically represents a so-called linked list arrangement of data elements 400, 410, 420. Here, the address of a subsequent data element in the link list is indicated by a pointer 405, 415, 425 within the data element. A similar representation is used of the trigger access locations 402, 412, 422. The data which the prefetcher would require to derive the location of a subsequent data element in the link list comprises the location (defined by Offset 1 or 430) of the pointer within the data element relative to the location of the trigger access, and, given that the pointer actually points to the start or a reference address 417, 427 within a subsequent data element, another offset (Offset 2 440 between the start or reference address of a data element and the trigger access location the values Offset 1 430 and Offset 2 440 allow, for a currently accessed data element, the prefetcher 120 to locate the pointer to the subsequent data element, and, from the reference address pointed to by that pointer, to locate the trigger access location for the subsequent data element.

To derive Offsets 1 and 2 for the linked list, an initial assumption is made that the data elements contain a pointer to a subsequent data element. Then, as each cache line of a data element is allocated, the line is scanned to detect data which appears to be a pointer, and such data is cached in a pointer cache to be discussed further below. For example, in a learning phase, when a trigger access to B is detected for the data element 410, the cached pointer data of data element is scanned for any possible pointer to B or (B−n) where n can be up to a predetermined limit assumed to be the maximum size of a data element. Note that only a negative sign is used, as it is assumed in this example that B lies within the data element and that if a pointer does not point to B itself, it points to an earlier address than B. The location of such a pointer within the data element provides the Offset 1.

If the detected pointer at the pointer location is to a particular address B-n for a data element having a trigger address of B, then the Offset 2 440 is n.

Therefore, in the examples of FIG. 4, the subsequent data element has a memory location pointed to by a pointer at a respective pointer location within the current data element; the memory address relationship comprises offset data (Offset 1) indicating the pointer location relative to a data element; and the prefetch circuitry is configured to apply the offset data to the current data element in order to access the pointer within the current data element defining a memory location for use in prefetching at least a portion of the subsequent data element.

This arrangement can be handled by a pointer detector (implemented by the detector 150) to detect, for each portion of a data element accessed by a program code iteration, whether that portion contains a pointer and to store, in a pointer cache, data defining the location within the data element and also the target of a detected pointer, and/or by a detector (implemented by the detector 150) to detect the memory address relationship, for storage in the data element structure memory, by a comparison of target locations within the pointer cache; the detector being configured to generate the offset data Offset1 in dependence upon a difference between the location of a given pointer (as recorded in the pointer cache) when the address difference between the current data element location and the target location for the given pointer is less than a threshold difference. For example, the prefetch circuitry may be configured to retrieve at least a portion of the subsequent data element and to detect using the memory address relationship stored in the data element structure memory a pointer to a further data element to be accessed by a further program iteration and to initiate prefetching of at least a portion of the further data element from memory.

Figure 5:
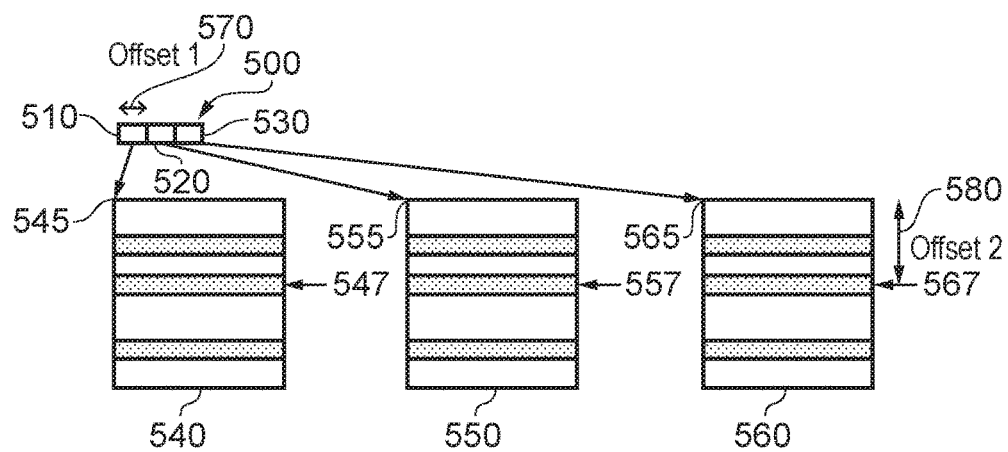
FIG. 5 schematically illustrates an array of pointers to data elements.

FIG. 5 schematically illustrates a further example of data element addressing, in which an array 500 of pointers 510, 520, 530 . . . point to reference addresses 545, 555, 565 within successive data elements 540, 550, 560. Given the location of a currently accessed pointer within the array 500 of pointers, the prefetcher requires an offset 570 (Offset 1 for the array of pointers example) between adjacent pointers in order to locate a next pointer and also an offset (Offset 2) 580 between the reference address 545, 555, 565 and the trigger access location 547, 557, 567 for each data element. The Offset 1 570 can be obtained from the difference in pointer location for the pointers to successive data elements, and the Offset 2 580 is derivable from the difference between a detected pointer destination and the respective trigger address.

In the example of FIG. 5, each data element has a memory location pointed to by a pointer stored at a respective pointer location; the memory address relationship comprises offset data (Offset 1) indicating an address separation between pointer locations for successive data elements; and the prefetch circuitry is configured to apply the offset data to the pointer location of the current data element in order to access a pointer defining a memory location for use in prefetching at least a portion of the subsequent data element. This arrangement can be handled by the detector 150 acting as a detector to detect the memory address relationship, for storage in the data element structure memory, from the pointer locations of pointers accessed by the program code iterations and to identify the offset data from an address separation between pointer locations. The detector 150 may be configured to store, in a pointer cache, data defining the location of a detected pointer, and/or may be configured to generate the offset data Offset1 as the address difference between a current pointer location and a previously accessed pointer location, for example where that difference is less than a threshold difference.

Figure 6:
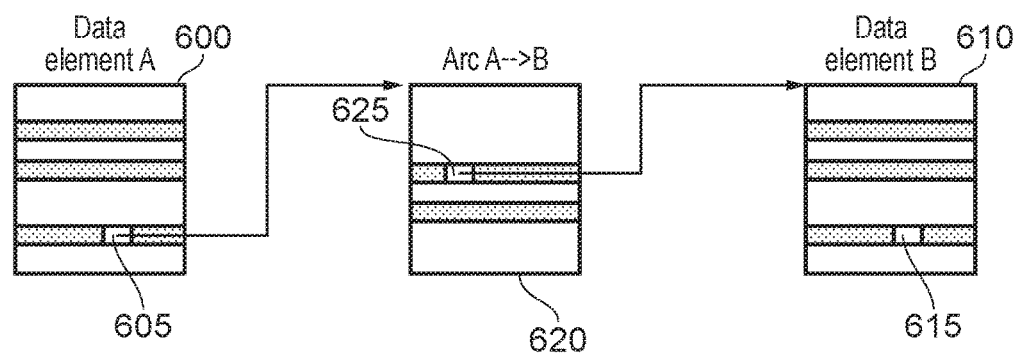
FIG. 6 schematically illustrates an arc link between data elements.
Figure 7:
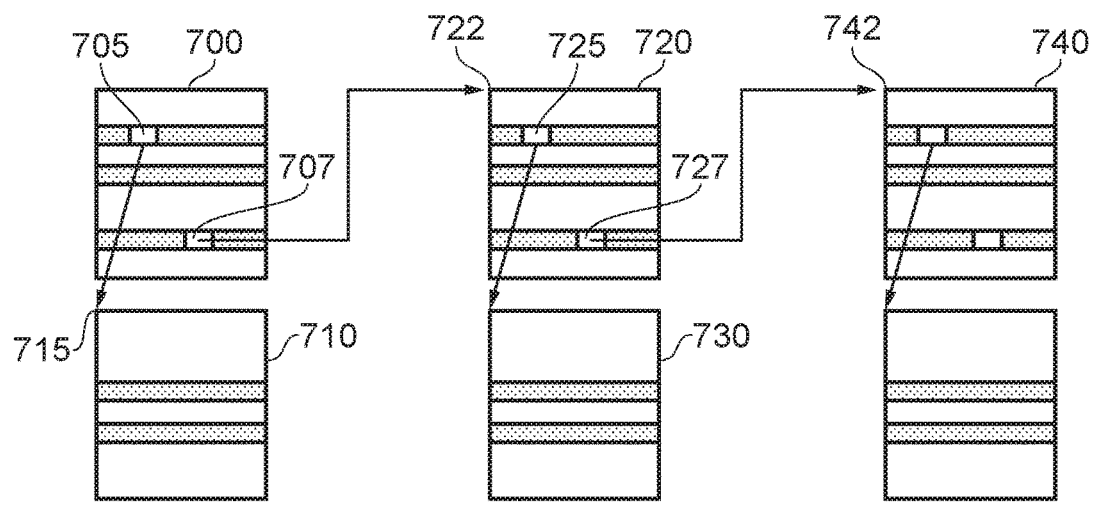
FIG. 7 schematically illustrates another example data structure.

Some more complex arrangements are indicated in FIGS. 6 and 7, which can be handled as direct combinations of the techniques discussed above.

In FIG. 6, an arrangement of two linked lists is provided so that there is a so-called arc relationship between a current data element 600 and a subsequent data element 610, in which a pointer 605 in the data element 600 points to a reference address in an intermediate data element 620, within which a pointer 625 points to a reference address in the subsequent data element 610. The subsequent data element 610 contains a corresponding point of 615 to a next intermediate element.

Another example is provided in FIG. 7, in which a linked list of elements is used, each having a pointer to a further element (which may be referred to colloquially as a so-called "backbone and ribs" arrangement). In this example, within a current data element 700, a first pointer 705 points to a reference address 715 in another portion of data 710, and a second pointer 707 points to a reference address 722 in a subsequent data element 720. Again, a pointer 725 points to a further portion of data 730 and a pointer 727 points to a reference address 742 in a subsequent data element 740.

Both of the arrangements of FIGS. 6 and 7 can be detected by the detector 150 using the techniques discussed above.

Figure 8:
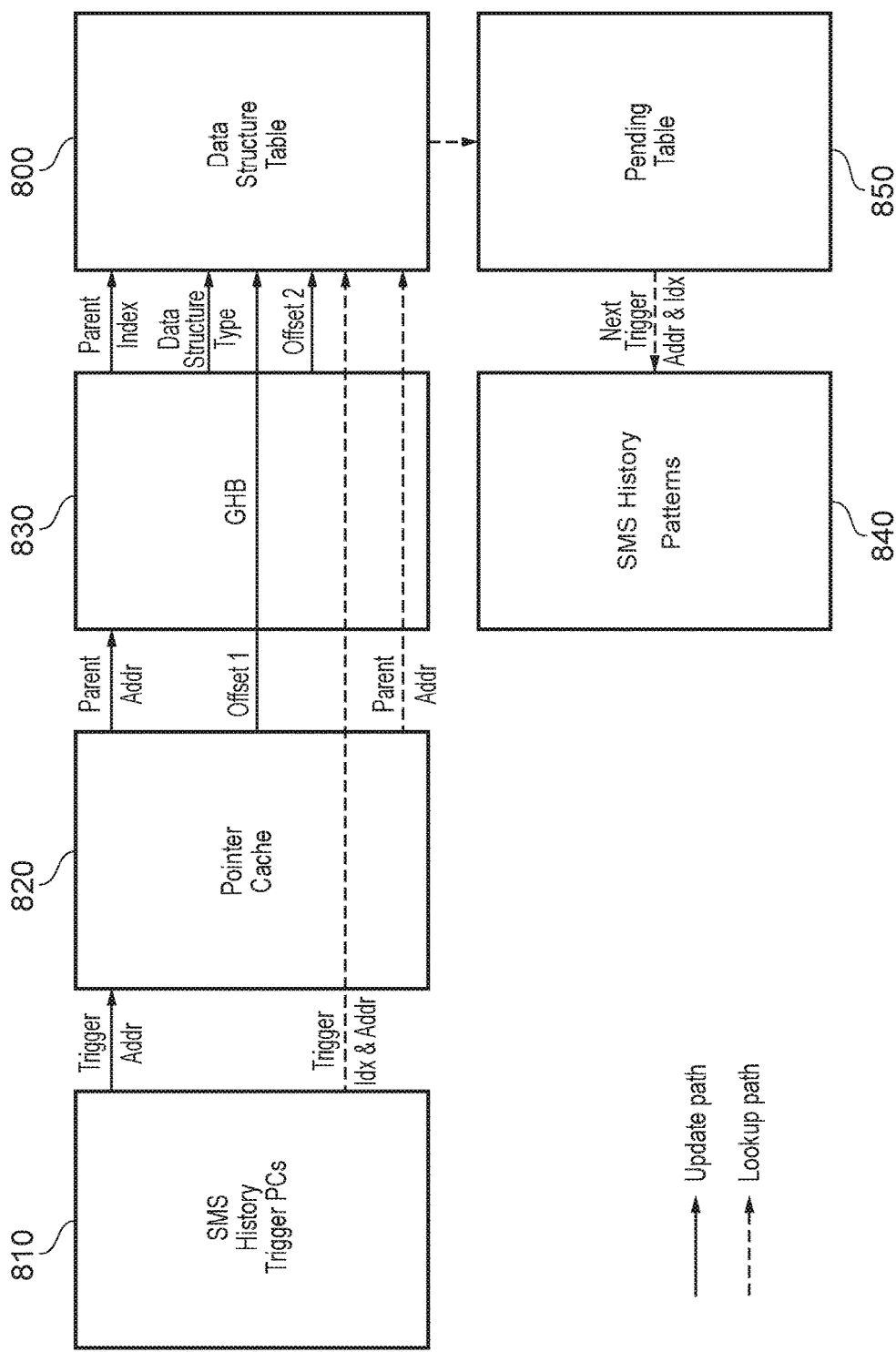
FIG. 8 schematically illustrates an example part of a data processing circuitry.

FIG. 8 schematically illustrates the operation of the apparatus described above in more detail, and in particular relates to the operation of the detector 150 and the structure memory 110, referred to in FIG. 8 as a data structure table 800. The apparatus of FIG. 8 comprises a history buffer 810 storing program counter (PC) values for instructions making a trigger access as discussed above, a pointer cache 820, a global history buffer 830, the data structure table 800 (corresponding in function to the structure memory 110 referred to above), an SMS history buffer 840 and a pending table 850.

Some examples of the use of a pointer cache to assist in prefetching are discussed in "Pointer Cache Assisted Prefetching", Collins et al, Proceedings of the 35$^{th}$ Annual International Symposium on Microarchitecture (MICRO-35), November 2002, the contents of which are incorporated herein by reference.

The use of a global history buffer in a prefetching situation is discussed in "Data Cache Prefetching Using a Global History Buffer", Nesbit et al, IEEE Micro, Volume: 25, Issue: 1, January-February 2005, the contents of which are incorporated herein by reference.

Two types of access are indicated schematically in FIG. 8, namely update (or learning) paths (solid lines) and lookup paths (broken lines).

In an update operation, for a table structure the difference between successive trigger addresses is detected and, assuming it is less than a threshold difference, is stored as Offset 1 in the Data Structure Table 800.

For the linked list and array of pointers, when each cache line (for example of 8 words of 64 bits) is accessed, the 8 words are scanned and compared with the trigger address. For this comparison, a plurality of most significant bits (MSBs) need to be identical and the three least significant bits (LSBs) need to be zero (for a 64 bit architecture) in order to point to an aligned structure. In a 32 bit architecture, the two least significant bits need to be zero. If this is found to be the case then the word is stored in the pointer cache as a potential pointer.

The pointer cache is updated at each line fill operation (a cache line being written to the cache memory 145) and, for example, a predetermined number (such as 64) of most recent pointers are maintained in the pointer cache.

In example arrangements, various relationships are detected with respect to the pointers stored in the pointer cache. If it exists, a pointer is identified which pointed to the reference address 417, 427 of a data element. This search is carried out amongst (for example) the most recent 16 pointers. If there is a hit, this identifies the address of the pointer and also Offset2 in FIG. 4. Information available at this stage can therefore include trigger addresses, and if there is a match, the parent address (pointer location) and Offset2 for a linked list arrangement. This information is stored in the global history buffer.

With regard to the global history buffer, the following relationships are detected where possible:
- the absolute value of a difference between successive trigger addresses is less than a threshold amount such as 64 words (each of 4 or 8 bytes depending on the architecture), indicating a potential table structure (so that the detector is arranged to generate the offset data as the address difference between a current data element location and a previously accessed data element location, where that difference is less than a threshold difference)
- the absolute value of a difference between successive parent addresses is less than a threshold amount such as 32 words (each of 4 or 8 bytes depending on the architecture), indicating a potential pointer table (so that the detector is arranged to generate the offset data as the address difference between a current pointer location and a previously accessed pointer location, where that difference is less than a threshold difference)
- the absolute value of a difference between a next parent address and a previous trigger address is less than a threshold amount such as 32 words (each of 4 or 8 bytes depending on the architecture), indicating a potential linked list structure (so that the detector 150 is arranged to generate the offset data in dependence upon the location of a given pointer in the pointer cache when the address difference between the current data element location and the target location for the given pointer is less than a threshold difference.)

Data defining any detected structural relationships (noting that as discussed with reference to FIGS. 6 and 7, there may be more than one such relationship present) is stored in the structure memory 110. A structure can be defined by, for example, the triggering history index, the triggered history index, the type of relationship between the indices (such as table, linked list, pointer table or the like), and Offset 1 and Offset 2 (from which the prefetcher 120 can derive the cache line to be prefetched).

In a lookup operation, a trigger access is detected by a comparison of the current PC with trigger access PCs stored in the history buffer 810. Note that at least in principle there could be multiple hits, for example because of a complex data structure or because out of order processing has replicated possible trigger accesses to a data element. A trigger address is provided to the data structure table 800.

In the case of a table structure, the next trigger address is derived by addition of Offset 1 as derived earlier and the following trigger address is derived and provided (with any related addresses obtained by the Spatial Memory Streaming techniques discussed above) for initiating of prefetching and held in the SMS history buffer 840.

In the case of a linked list or an array of pointers, the prefetcher needs to read the data corresponding to the head of the subsequent data element. This is found in each case by adding Offset1 to the trigger address. When the data is returned, the next trigger address is computed by adding Offset 2. In the meantime, while waiting for the return of the load, Offset 2 and the Spatial Memory Streaming pattern (defining addresses relative to the trigger address) are stored in the pending table 850.

Corresponding techniques are used in the case of more complex data structures, for example those discussed above in which a pointer can point to a data element itself containing a pointer to a subsequent data element to be accessed.

Figure 9:
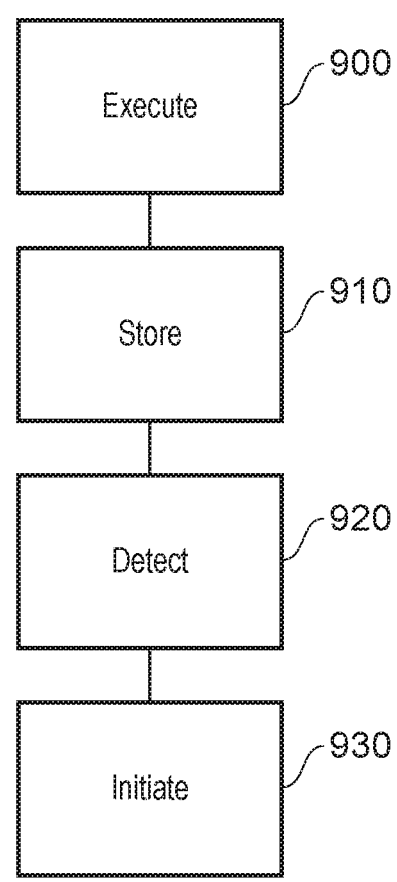
FIG. 9 is a schematic flowchart illustrating a method.

FIG. 9 is a schematic flowchart illustrating a data processing method comprising:
executing (at a step 900) successive iterations of program code to access a set of data elements in memory, each iteration accessing one or more respective data elements of the set;
storing (at a step 910) a memory address relationship between the data elements of the set; and
in response to an access by a current program code iteration to a current data element of the set, detecting (at a step 920), using the stored memory address relationship, a memory address defining a subsequent data element to be accessed by a next program iteration and initiating (at a step 930) prefetching of at least a portion of the subsequent data element from memory.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing circuitry comprising:
    a processing element to execute successive iterations of program code to access a set of data elements in memory, each iteration accessing one or more respective data elements of the set;
    a data element structure memory to store a memory address relationship between the data elements of the set; and prefetch circuitry, responsive to an access by a current program code iteration to a current data element of the set, to detect, using the memory address relationship stored in the data element structure memory a memory address defining a subsequent data element to be accessed by a next program iteration and to initiate prefetching of at least a portion of the subsequent data element from memory; wherein:
the subsequent data element has a memory location pointed to by a pointer at a respective pointer location within the current data element;
the memory address relationship comprises offset data indicating the pointer location relative to a data element; and
the prefetch circuitry is configured to apply the offset data to the current data element in order to access the pointer within the current data element defining a memory location for use in prefetching at least a portion of the subsequent data element.

2. Circuitry according to claim 1, in which:
the detector is configured to store, in a pointer cache, data defining the location of a detected pointer;
each data element has a memory location pointed to by a pointer stored at a respective pointer location;
the memory address relationship comprises offset data indicating an address separation between pointer locations for successive data elements; and
the prefetch circuitry is configured to apply the offset data to the pointer location of the current data element in order to access a pointer defining a memory location for use in prefetching at least a portion of the subsequent data element.

3. Circuitry according to claim 2, comprising:
a detector to detect the memory address relationship, for storage in the data element structure memory, from the pointer locations of pointers accessed by the program code iterations and to identify the offset data from an address separation between pointer locations.

4. Circuitry according to claim 3, the detector being configured to generate the offset data as the address difference between a current pointer location and a previously accessed pointer location, where that difference is less than a threshold difference.

5. Circuitry according to claim 3, in which the prefetch circuitry is configured to retrieve at least a portion of the subsequent data element and to detect using the memory address relationship stored in the data element structure memory a pointer to a further data element to be accessed by a further program iteration and to initiate prefetching of at least a portion of the further data element from memory.

6. Circuitry according to claim 1, in which:
the data elements have memory locations separated by an element displacement;
the memory address relationship comprises offset data indicating the element displacement; and
the prefetch circuitry is configured to apply the offset data to the memory location of the current data element in order to derive a memory location for use in prefetching at least a portion of the subsequent data element.

7. Circuitry according to claim 6, comprising:
a detector to detect the memory address relationship, for storage in the data element structure memory, from the memory locations of data elements accessed by the program code iterations and to identify the offset data from an address separation between memory locations.

8. Circuitry according to claim 7, the detector being configured to generate the offset data as the address difference between a current data element location and a previously accessed data element location, where that difference is less than a threshold difference.

9. Circuitry according to claim 6, in which the prefetch circuitry is configured to retrieve at least a portion of the subsequent data element and to detect using the memory address relationship stored in the data element structure memory a pointer to a further data element to be accessed by a further program iteration and to initiate prefetching of at least a portion of the further data element from memory.

10. Circuitry according to claim 1, comprising a pointer detector to detect, for each portion of a data element accessed by a program code iteration, whether that portion contains a pointer and to store, in a pointer cache, data defining the location within the data element and the target of a detected pointer.

11. Circuitry according to claim 10, comprising:
a detector to detect the memory address relationship, for storage in the data element structure memory, by a comparison of target locations within the pointer cache; and
the detector being configured to generate the offset data in dependence upon the location of a given pointer in the pointer cache when the address difference between the current data element location and the target location for the given pointer is less than a threshold difference.

12. Circuitry according to claim 1, in which the prefetch circuitry is configured to retrieve at least a portion of the subsequent data element and to detect using the memory address relationship stored in the data element structure memory a pointer to a further data element to be accessed by a further program iteration and to initiate prefetching of at least a portion of the further data element from memory.

13. Circuitry according to claim 1, in which:
a program code iteration is configured to first access a data element at a first access address within the data element;
the memory address relationship comprises second offset data representing the location of the first access address within each data element; and
the prefetch circuitry is configured to prefetch at least a portion of the subsequent data element at the first access address within the subsequent data element defined by the second offset data.

14. Circuitry according to claim 13, in which:
the prefetch circuitry is responsive to data defining one or more other access addresses, relative to the first access address, to prefetch respective portions of the data element at the one or more other access addresses.

15. Circuitry according to claim 1, comprising:
a detector to detect the memory address relationship, for storage in the data element structure memory, from data defining data elements accessed by the program code iterations.

16. Circuitry according to claim 15, in which the detector is configured to maintain a history buffer storing data defining data elements accessed by one or more previous program code iterations.

17. Data processing circuitry comprising:
processing means for executing successive iterations of program code to access a set of data elements in memory, each iteration accessing one or more respective data elements of the set;
data element structure storing means for storing a memory address relationship between the data elements of the set; and prefetch means, responsive to an access by a current program code iteration to a current data element of the set, for detecting, using the memory address relationship stored in the data element structure storing means, a memory address defining a subsequent data element to be accessed by a next program iteration and for initiating prefetching of at least a portion of the subsequent data element from memory; wherein:

the subsequent data element has a memory location pointed to by a pointer at a respective pointer location within the current data element;

the memory address relationship comprises offset data indicating the pointer location relative to a data element; and the prefetch means is operable to apply the offset data to the current data element in order to access the pointer within the current data element defining a memory location for use in prefetching at least a portion of the subsequent data element.

18. A data processing method comprising:

executing successive iterations of program code to access a set of data elements in memory, each iteration accessing one or more respective data elements of the set;

storing a memory address relationship between the data elements of the set; and in response to an access by a current program code iteration to a current data element of the set, detecting, using the stored memory address relationship, a memory address defining a subsequent data element to be accessed by a next program iteration and initiating prefetching of at least a portion of the subsequent data element from memory;

the subsequent data element has a memory location pointed to by a pointer at a respective pointer location within the current data element;

the memory address relationship comprises offset data indicating the pointer location relative to a data element; and the detecting step comprises applying the offset data to the current data element in order to access the pointer within the current data element defining a memory location for use in prefetching at least a portion of the subsequent data element.

* * * * *